United States Patent [19]

Kalinin et al.

[11] 4,255,373

[45] Mar. 10, 1981

[54] METHOD FOR MANUFACTURING HIGHLY REFRACTORY ALUMINUM AND MAGNESIUM OXIDE CERAMIC ITEMS

[76] Inventors: Viktor P. Kalinin, Slavyansky bulvar, 3, kv. 11, Moscow; Sergei P. Avdjukhin, ulitsa Jubileinaya, 10, kv. 46, Zheleznodorozhny Moskovskoi oblasti; Vsevolod I. Lebedev, ulitsa Tsandera, 4, korpus 2, kv. 11, Moscow; Viktor F. Zhilin, 10 ulitsa Sokolinoi Gory, 4, kv. 99, Moscow; Vladimir S. Frolov, ulitsa 11 Parkovaya, 10, kv. 58, Moscow; Jury V. Anisimov, prospekt Budennogo, 23, kv. 15, Moscow; Jury T. Slavin, ulitsa Tishinskaya, 1, kv. 6, Moscow; Valentin N. Larionov, ulitsa Latsisa, 16, korpus 3, kv. 48, Moscow, all of U.S.S.R.

[21] Appl. No.: 46,791

[22] Filed: Jun. 8, 1979

[51] Int. Cl.$^3$ .......................... F27D 7/06; C04B 35/04; C04B 35/10
[52] U.S. Cl. ......................................... 264/65; 106/62; 423/600; 264/66
[58] Field of Search .......................... 106/62; 423/600; 264/25, 26, 65, 66

[56] References Cited

U.S. PATENT DOCUMENTS

| | | | |
|---|---|---|---|
| 2,805,167 | 9/1957 | McCreight et al. | 106/62 |
| 3,304,153 | 2/1967 | Bakker et al. | 106/62 |
| 3,950,504 | 4/1976 | Belding | 423/600 |

FOREIGN PATENT DOCUMENTS 487285  10/1975  U.S.S.R.

OTHER PUBLICATIONS

Korolev et al., "Shaped Casting by the Lost Wax Process", Oborongiz Publisher, Moscow, 1962, pp. 96–97.
Belkevich, U. L., "Technical-Grade Ceramics", Moscow, 1968, pp. 177–178.

*Primary Examiner*—O. R. Vertiz
*Assistant Examiner*—Mark Bell
*Attorney, Agent, or Firm*—Haseltine and Lake

[57] ABSTRACT

A mixture containing 65 to 72% by weight of aluminum oxide and 28 to 35% by weight of magnesium oxide is used to mold items which are then dried in vacuum at a temperature of a heater, which is a component element of a mold, attaining about 1000° C., the items being subsequently subjected to a burn in an inert gas atmosphere at a temperature of approximately 1850° C. and at a rate of more than 100° C./minute.

The present invention permits the time required to manufacture the items to be brought down to 2–4 hours, the items produced being characterized by a high refractoriness, capable of withstanding temperatures of up to 1850° C., high chemical inertness and resistance to dynamic action of refractory alloys and steels during melting and casting thereof. Thermal shock resistance of the manufactured items is 60 to 70 air thermal (heating-cooling) cycles.

2 Claims, No Drawings

METHOD FOR MANUFACTURING HIGHLY REFRACTORY ALUMINUM AND MAGNESIUM OXIDE CERAMIC ITEMS

BACKGROUND OF THE INVENTION

1. Field of the Invention

The present invention relates to the metallurgical industry and more particularly to methods for manufacturing highly refractory spalling-resistant ceramic items employed in metallurgical practice.

The invention can be used, for example, for manufacturing crucibles employed for melting and pouring refractory alloys, for example nickel-based alloys containing such alloying components as chromium, tungsten, molybdenum, niobium, tantalum, aluminum, titanium, zirconium, carbon and rare-earth elements which require overheating to a temperature of 1650° C. in finishing and pouring; steels containing such alloying elements as nickel, chromium, molybdenum, vanadium, aluminum, titanium, which require overheating to a temperature of up to 1750° C. in finishing and pouring. The invention can also find application in the manufacture of conduits for metals employed in pouring said alloys into casting molds.

2. Description of the Prior Art

There is known a method for manufacturing refractory thermal shock resistant ceramic items from synthesized alumo-magnesia spinel, including two stages. At the first stage of this method, an alumo-magnesia spinel is synthesized by burning, at a temperature of 1750° C., briquettes pressed from a mixture of 65-70% by weight of aluminum oxide and of 35-30% by weight of magnesium oxide wherein synthesizing is accomplished by fusing said mixture of oxides. The burned briquettes are cooled, crushed and ground, the resultant grains being sided and used to prepare lining masses thereafter. These masses go to press as "green" items, which are dried and finally burned in tunnel or gas-(fired) furnaces at a temperature of 1700° C.

The rate of temperature rise is limited by the admissible temperature gradient across the body of a pressed item, as it determines the intensity of vapor formation and the magnitude of thermal stresses in the body of a pressed item. Therefore, the rate of temperature rise in burning of pressed items is in the order of several tens of degrees per hour, and the full burning cycle takes 3.5-4 days (see, for example, pp. 225-230, 132-134, "Khimicheskaya tekhnologiya keramiki i ogneuporov" (Chemical Technology of Ceramics and Refractories), ed. by academician of the Academy of Sciences of the Ukrainian Soviet Socialist Republic P. P. Butnikov and Dr. of Technical Sciences, Prof. D. N. Poluboyarinov, Building Literature Publishers, Moscow, 1972).

The above method suffers from a number of disadvantages.

In the first place, there is a high labour consumption in the charge preparation and duration of burning of "green" items.

There is also known a method for manufacturing refractory ceramic items, such as crucibles wherein use in made of a synthesized alumo-magnesia spinel, by melting a mass consisting of the following components:

fused magnesite containing 90-96% magnesium oxide, 70% by weight;
electrolytically produced corundum containing 99% aluminum oxide, 25% by weight;
zirconium dioxide, 3.5% by weight;
titanium dioxide, 1.5% by weight.

At the second stage of the manufacture of items by this method, as lumps obtained by melting are crushed, ground and sized, the resultant powders are mixed in required size fraction proportions. A crucible is rammed in an inductor using a hollow metallic ramming form and dried, first naturally for 20-24 hours, then with the aid of an inserted electric heater, for 8-10 hours at a temperature of 650°-700° C. Next, the crucible is subjected to a burn effected for 3-4 hours by raising the temperature of the heater to 1350°-1400° C., then burned by introducing a charge of cast iron into the form, melting and holding it at a temperature of 1450°-1500° C. for 15-20 minutes, pouring cast iron into molds, subsequently melting in the crucible a charge of an alloy to be melted in working heats with a view to washing out contaminating elements contained in the materials of the ramming form and cast iron off the crucible walls, and finally pouring the alloy into molds.

The rammed circible thus obtained has a structure consisting of a weakly burned working surface of the crucible, several millimeters thick, and an underlying layer of unburned spinel grains.

Rammed crucibles manufactured according to the above procedure have a high refractoriness of the working surface of the crucible and a relatively high thermal shock resistance. However, this method also has some disadvantages, for example, such as high labor requirements for charge preparation; weak burning of the working surface of the crucible due to low burning temperature and, as a consequence, poor resistance to attack by slag; shutdown of melting-and-pouring furnaces during the replacement of the crucible (for knocking out the worn crucible, ramming and burning in a fresh crucible); loss of costly working alloys for wash heats.

SUMMARY OF THE INVENTION

It is therefore an object of the invention to provide a method which will make it possible to manufacture highly refractory ceramic items in a shorter time.

Another object of the invention is to provide a method for manufacturing highly refractory ceramic items which will permit the manufacturing costs to be cut down.

Yet another object of the invention is to provide a method whereby it will become possible to enhance the thermal shock resistance of the resultant high refractory ceramic items.

The above and other objects are attained in a method for manufacturing highly refractory ceramic items from aluminum and magnesium oxides, consisting in introducing and compacting the above starting oxides in a mold with a heater mounted in the center thereof, drying and subsequently burning molded items, wherein according to the invention, drying is performed by raising the temperature of the heater at a rate of 30°-60° C./min. to 400° C.-450° C. and at a rate of 30°-100° C./min to 950°-1050° C. in a vacuum, whereas burning of the items is effected in an inert gas atmosphere by raising the temperature of the heater at a rate equal to or higher than 100° C./min. to 1800°-1850° C., the items then being held, first, at a temperature of 1800°-1850° C. for a time sufficient to enable free separation of the above heater from the items being burned, then holding said items in vacuum at the same temperature.

The effect of this method for fabricating ceramic items resides in that the time of manufacture of items drops from 5-7 days to 2-4 hours, the working surface of the items is a well-burned solid ceramic structure having a refractoriness of up to 1850° C., high chemical inertness and resistance to dynamic action of refractory alloys and high-alloy steels in melting and pouring, a high service thermal shock resistance, due to the structure of the ceramics being formed through a sided unilaterally directed burning of items, amounting to 60-70 air thermal cycles (one thermal cycle involving a variation of the temperature between +1600° and 20° C.).

These and other objects and features of the invention will become readily apparent from a detailed description of a method for manufacturing highly refractory ceramic items and preferred embodiments thereof.

DETAILED DESCRIPTION OF THE INVENTION

Masses for manufacturing refractory items possessing a high chemical inertness with respect to melts of refractory alloys based on nickel and of high-alloy steels are essentially fused magnesium and aluminum oxides.

In addition to simple oxides, the binary system $MgO-Al_2O_3$ has a single chemical compound $MgAl_2O_4$, or an alumo-magnesia spinel, formed through interaction of MgO and $Al_2O_3$ and containing 71.7% by weight of aluminum oxide and 28.3% by weight of magnesium oxide. The spinel has a melting point of 2135° C. and forms with magnesium oxide an eutectic mixture containing 32.5% (mol.) aluminum oxide, whose melting point is 1995° C., and with aluminum oxide, an eutectic mixture containing 95.5% (mol) MgO, whose melting point is 1920° C.

Alumo-magnesia spinel has a greater, as compared to magnesium oxide and to aluminum oxide, inertness with respect to melts of the above alloys, but even at temperatures higher than 1750° C. the burning of spinel remains unsatisfactory. To improve the burning of grains of alumo-magnesia spinel, an excess amount of one of the components, magnesium or aluminum oxide, is added thereto.

Refractory ceramic items based on alumo-magnesia spinel can be obtained by using a mixture of oxides containing 28-35% by weight of commercial-purity magnesium oxide, up to 4% by weight of various impurities, such as CaO, $SiO_2$ and others, and 72-65% by weight of commercial-purity aluminum oxide (not more than 1% by weight of impurities).

Naturally occurring alumo-magnesia spinel is contaminated with impurities lowering the refractoriness and chemical resistance thereof with respect to alloys, for example, those based on nickel or iron. This explains why spinel intended for the manufacture of refractories is obtained by synthesis.

The most effective procedure for synthesizing spinel is burning, which involves a solid phase heterogeneous diffusion reaction between magnesium and aluminum oxides.

When the synthesis of the above spinel is combined with a thermal processing of manufactured items, the growth in volume of the items may attain 20-30%. This is due to the fact that the magnesia spinel has a less compact crystalline structure of the cubic lattice as compared to a hexagonal lattice of corundum manufactured electrolytically and to a hexacyclical lattice of periclase inertness, the density of spinel being a mere 3.27 g/cm$^3$, whereas that of corundum is 3.8 g/cm$^3$, and that of periclase, 3.58 g/cm$^3$. Combination of the synthesis of spinel with the thermal processing of items being manufactured results, because of a temperature gradient across the items, in different rates of the processes of internal synthesis and shrinkage and, therefore, in different speeds of variation of these volumes, this underlying the deformation and cracking of items being burned. Refractory the items, which are highly thermal shock resistant and capable of withstanding the dynamic action of melts, are generally ceramic items having a thin solidly-burned layer forming the working surface of the refractory and a porous weakly-burned internal stucture.

As the magnitude of thermal stresses in a material is proportional to the gradient of temperatures therein, both during burning and in service, the stresses occurring in a loose, porous, weakly burned part of the items are relaxed through disintegration of bonds in the structure, so that only the layer of well-burned ceramics remains in the stressed state. The thinner the layer, the lesser is the drop in temperature across it and the lesser are the stresses caused by temperature variations occurring in the ceramics under service conditions.

It was found that such a structure in ceramics can be obtained through a sided unilaterally directed burning by providing a suitable temperature gradient across the items being burned.

With the aim of combining the thermal processing of items being manufactured with the synthesis of alumo-magnesia spinel and the provision of a thermal shock resistant structure in the items, capable of withstanding the dynamic action of melts inducing the failure of the surface of the items, the following conditions are provided for drying and burning green items:

1. Green items should be burned from one side and in a direction from the axis to the periphery.

2. Particles of the material of green items should be bonded one to another through structural and mechanical cohesion only, i.e. green items should have no starting mechanical strength or the magnitude thereof should be at a minimum.

3. The structure of burned items must consist of two or three layers, and the internal layer should be as thin as is practicable, possess high strength and high density acquired through deep burning; the subsequent peripheral layers should have a lesser strength and a loose structure. Such a structure of the items ensures minimum tensile and compressive stresses in the internal (working) well-burned layer of the items, during both burning and service of the items under temperature variations, since the stresses induced in weak loose layers materialize in cracking and are dampened in the pores of poorly burned parts of the ceramic items. In addition, the solid, strong and thin internal (working) layer of the items will have a minimum temperature gradient because of a high thermal conductivity thereof and a low thermal conductivity of the poorly burned loose peripheral layers.

The above structure of green items compensates for an increase in the volume thereof during the layer-by-layer unilaterally directed burning, simultaneous with the synthesis of alumo-magnesia spinel.

4. Burning conditions should rule out any chemical interaction of the source of heat and of the surrounding medium with the starting oxides and spinel resulting from the burning of the items.

The above conditions are provided by a unilaterally directed burning of a mixture of magnesium and aluminum oxides, placed in a mold cooled on the outside and defining the external surface of the items being burned, with the aid of a heater located in the center of the mold and forming the internal working surface of the items under conditions specified in the method according to the present invention.

According to the invention, the starting product for obtaining ceramic items is a mixture consisting of 65-72% by weight of aluminum oxide and 28-35% by weight of magnesium oxide. Once this mixture is introduced into a mold, for example, by ramming, it is dried with the temperature of a heater, located in the center of the mold, being raised, first, in the open atmosphere at a rate of 30°-60° C./min to 400°-450° C., then at a rate of 30°-100° C./min to 950°-1050° C. in a vacuum of $5.10^{-1}$ to $5.10^{-2}$ mm Hg. The subsequent burning of the items is effected in an inert gas atmosphere, for example, argon or helium, at an increasing temperature of the heater proceeding at a rate equal to or higher than 100° C./min to a temperature of 1800°-1850° C., then subjecting the items to a burn at a temperature of approximately 1850° C. for a time sufficient to enable free separation therefrom of the above heater and finally under vacuum at the above temperature of 1800°-1850° C.

Consider now the processes occurring in burning and explaining the results achieved by the method for manufacturing highly refractory thermal shock resistant ceramic items, according to the present invention.

When an item is heated from a starting temperature ($t_s$) to a temperature of onset of burning ($t_{ob}$), the item is a uniformly packed body of a mixture of grains of the oxides $Al_2O_3$ and MgO. The heating of the item in an oxidizing atmosphere to 400° C. and in a vacuum from 400° C. to $t_{ob}$ is accompanied by the following processes and phenomena:

removal of fixed moisture in the range from the starting temperature to 120°-150° C. and of chemisorbed moisture effected at substantially higher temperatures, the reaction proceeding as follows

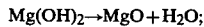

$$Mg(OH)_2 \rightarrow MgO + H_2O;$$

reduction by carbon of the heater of several oxides (impurities), inclusive of $K_2O$, $Na_2O$, $Fe_2O_3$, according to the reaction:

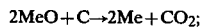

$$2MeO + C \rightarrow 2Me + CO_2;$$

increase in the volume of gases inside the green item because of heating and of a drop in pressure as a vacuum is built up inside the burning chamber;
build-up of a difference in pressure inside the burning chamber and the item proper on build-up of vacuum;
increase in the volume of the item due to heating;
appearance of stresses in the item proper and across the "item-heater" and "item-mold" boundaries.

The above processes and phenomena limit the rate of the one-sided heating of the item, which is one of the main factors governing the gradient of temperature across the item, at a rate of 30° to 100° C./min.

Stresses induced in the item on heating within the above range of temperatures impose no limitation upon the rate of rise of temperature of the heater, as the stresses are relaxed through mobility of the grains in the absence of strong bonds therebetween and availability of a sufficient free volume in the form of pores.

On further unilateral heating of the item from the temperature of $t_{ob}$ to that of the end of burning ($t_{eb} = 1850°$ C.), the item should be considered not a structurally homogeneous body, but one composed of structurally different zones.

It is self-evident that a high rate of temperature rise of the heater will result in a considerable gradient of temperature from the center of the item to the periphery thereof because the thermal conductivity of the item is low and the mold cools. The higher the rate of heating, the greater is the temperature gradient in the material of the item, the thinner will be the layer of the item within the range of temperature of effective burning of the item ($t_{eff}$). This condition is one of a frontal burning of the item from the center to the periphery under which the changes in volume occurring in the thin burned layer of the item through spinel formation are compensated for by structurally-mobile unbonded grains of the unburned part of the item whose temperature at the boundary with the front of burning is less than $t_{eff}$. In such a thin effectively burned elementary layer, stresses that are bound to occur will be relaxed by the presence of pores and of mobile grains in adjacent volumes.

Obviously, the temperature gradient across the item will smoothen out with the course of time, and layers of the item adjacent the burned part will heat to $t_{eff}$, so that burning will begin. It is very important to conduct burning in such a manner as to avoid this phenomenon. The relevant burning parameters are, all other conditions being equal, the rate of rise of the temperature of the heater, the holding time at the burning temperature and the residual pressure of gases during burning and holding.

Thus, as frontal burning proceeds, stresses in the elementary layer are dampened by adjacent loose poorly cohesive layers lacking in bonds between grains and featuring a considerable amount of pores. The thinner the layer of frontal burning, the readier can the volume growth be compensated. The frontal burning is favored by the recommended rates of rise of temperature of the heater.

The minimun rate of rise of the heater temperature is governed by the ratio of the time required to attain the temperature of the effective burning of the layer adjoining the heater to the time it takes for a rigid bond framework to appear in this layer. This ratio should always be greater than unity, otherwise the expanding heater will break up the framework formed of oxide grains, this inducing cracks in the layer of the item adjacent the heater.

It is common knowledge that the effectiveness of diffusion processes governing the solid phase burning, which produces a solid and strong ceramic structure, is proportional to the temperature.

Because of this, it is imperative to provide a maximum admissible temperature on the heater to burn the layer of oxides adjacent the heater. The factor which limits the burning temperature is the appearance during burning of a liquid phase, i.e. fusion of the refractory, the thermal shock resistance of such a ceramic. For oxides of the system $MgO-Al_2O_3$, the melting point of the eutectic containing 95.5% (Mol.) $Al_2O_3$ is 1920° C. For commerically-pure oxides, the temperature of the eutectic transformation falls off by 50°-60° C., and the molten phase can be formed in burning at temperatures of approximately 1860°-1880° C.

In this connection, the maximum admissible temperature of the heater during the burning of the oxides of the item in the method according to the present invention is limited to the range of 1800° to 1850° C.

The material of the heater should have a high thermodynamic stability with respect to the oxides making up the green ceramic item under the burning conditions above.

The material of the heater must not change its composition and properties during heating to burning point and in the process of burning of the item and must admit of repetitive use.

The use of some materials which react partially with magnesium and aluminum oxides and show no tendency to interact with these oxides at high temperatures is often impracticable because of technical or economic considerations. However, there are a number of materials which react partially with the above oxides, forming a gaseous phase. In the general case, such a reaction can be written thus:

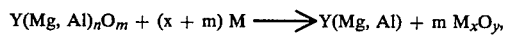

$$Y(Mg, Al)_nO_m + (x + m) M \longrightarrow Y(Mg, Al) + m M_xO_y,$$

where M is the material of the heater.

The equilibrium of such a reaction is characterized by a constant K:

$$K = \frac{a^y_{(Mg, Al)} \cdot a^m_{M_xO_y}}{a^y_{(Mg, Al)nOm} \cdot a^{m+x}_M},$$

where a is the activity of the respective component.

As a first approximation, the activity of magnesium and aluminum oxides, the activity of the material of the heater and the activity of the obtained metals are assumed equal to unity, whereas the activity of the resultant gaseous oxide MgO can be expressed through the partial pressure $P_{M_xO_y}$, whence $$K = P_{M_x}{}^m{}_{O_y}.$$

i.e. the rate of the reaction can be decreased by a deliberate increase of the partial pressure of the resulting gaseous phase.

Technically, it is not always possible to obtain a sufficient amount of the necessary gaseous phase. In order to shift the reaction toward the left, the space where burning is conducted can be filled to good advantage with an inert gas, this slowing down the diffusion of the gaseous phase resulting from the interaction, i.e. shifting the reaction from the kinetic to the diffusion range and so decreasing the rate of the interaction.

Once the oxides are burned to produce a framework capable of withstanding the pressure of the mixture of oxides expanding beyond the burned layer of the oxide mixtures, it is useful, before this layer shrinks, to separate the heater from the item being burned and so provide a gap to avoid contact interaction of the heater material with the oxides of the item.

The burning must continue in vacuum so as to eliminate a chemical interaction between the heater and the oxides and prolong the time of frontal burning through a decrease in the thermal conductivity of the item being burned by eliminating a convective heat exchange in the item and hold back the levelling of the temperature gradient from the center to the periphery of the item.

High temperature of the heater (within 1850° C.), heat transmission by radiation to the item, drop in the heat conductivity of the item in a vacuum provide favorable conditions under which the temperature gradient inside the item is retained for some time so as to ensure a dead burning of the surface layer of the item directly adjacent the heater and a differentiated burning of the underlying layers. The ratio of the thicknesses of these layers is determined, in the first place, by the rate of rise of the heater temperature from approximately 950° C. to 1850° C. in argon, the holding time in argon or helium before the heater is separated from the item and the time of burning of the item in vacuum at a residual pressure of $5.10^{-1}$ to $5.10^{-2}$ mm Hg.

Therefore, to combine the synthesis of the magnesia spinel from the oxides MgO and $Al_2O_3$ with the burning of refractory items and to obtain a thermal shock resistant structure of refractories, it is essential:

1. To conform to the rate of rise of the heater temperature within the range suggested in the present invention.

2. To maintain the temperature of the heater in the course of the burning of the oxides at about 1850° C.;

3. To minimize the rate of the chemical interaction of the heater with magnesium and aluminum oxides through direct physical contact by conducting burning in argon and out of any physical contact between the heater and the item.

4. To complete the burning of the item under vacuum after the heater is separated from the item.

Burning and forming of refractory items by the method of the invention are carried out in a mold having a heater located in its center.

The formation of the internal working surface of the refractories, drying and burning of oxides are performed with the aid of a heater.

The heater should be shaped so as to enable it to be stripped off the items in the course of burning to provide a gap therebetween.

The material of the heater should possess both high refractoriness (of the order of 2000° C.) and high thermal stability, and should be heated in a medium-frequency electromagnetic field and form, on burning the items, no solid phases with magnesium and aluminum oxides. These requirements are met by, for example, graphite.

The mold ensures the shaping of a green item by packing of oxides and the regulation of the heat transmission from the heater to the mold during the burning of the items.

The method according to the present invention can be used to manufacture, for example, melting crucibles in capacities from 5 to 60 kg in terms of refractory alloys and steels.

To this end, a mixture of oxides MgO and $Al_2O_3$ taken in a ratio of on the average 28-35% by weight and 72-65% by weight respectively, is packed in a mold with insertion of a heater from graphite in its center. The mold and the green crucible it holds are placed in an inductor of a burning chamber having means for building up an atmosphere of argon and a vacuum in the chamber.

The heater is connected to the secondary circuit of the inductor, and the thermal processing is carried out according to the following conditions: a rise of the temperature of the heater in an oxidizing atmosphere up to 400°-450° C. at a rate of 40° C./min., and from 400° to 1050° C. in a vacuum at a rate of 70° C./min. With the heater temperature equal to 950°-1050° C., the burning chamber is filled with argon to a pressure of 100-600 mm Hg, and the temperature of the heater is raised to 1800°-1850° C. at a rate of 120° C./min. until the heater is separated from the green crucible, burning of the crucible being subsequently continued at a temperature of 1800°–1850° C. in vacuum, the heater and the crucible being out of contact. Once the burning is completed, the heater is removed from the secondary circuit of the inductor, the crucible is cooled and taken out of the mold.

A crucible manufactured by the method according to the present invention contains an internal layer, in contact with the melt, up to 90% of alumo-magnesia spinel, has a solidly burned working surface and is capable of withstanding 70 and more heats with proper care.

It goes without saying that the above description of the method according to the present invention omitted all those process operations which are known to those skilled in the art of manufacturing fancy shaped ceramic items. The invention will be further described by the following illustrative Examples.

EXAMPLE 1

Crucibles 5 kg in capacity in terms of steel, intended for smelting steels and alloys, are manufactured from aluminum and magnesium oxides pre-dried at a temperature of 200° C. for 2 hours and taken in the proportions of 70 and 30% by weight respectively.

The mixture of the oxides is packed into a ceramic mold, a graphite rod heater being placed at the center of the mold. The temperature of the heater is raised in air to 400° C. at the rate of 60° C./min., and from 400° to 1000° C. in a vacuum of $5.10^{-1}$ mm Hg (with residual air pressure) at the rate of 100° C./min. With the temperature of the heater being equal to 1000° C., the furnace is filled with argon, and the temperature of the heater is raised to 1850° C. at the rate of 200° C./min., the mold with the item then being held at this temperature. After a free separation of the heater from the crucible walls, the crucible is held at a temperature of 1850° C. under vacuum out of contact with the heater.

The overall thermal processing cycle takes not more than 80 min. The structure of the resultant crucibles can be described in terms of three layers: a first layer, solidly burned, 0.5 to 2 mm thick; a second layer, less burned, 5 to 15 mm thick; a third layer, burned only at the surfaces of contact of the grains and consisting practically of the starting oxides. The porosity of the crucibles increased from the first layer, defining the internal surface of the crucibles, to the third layer, defining the external surface of the crucibles. The content of spinel in the first layer ranged between 60 and 90% by volume, depending on the burning time. The thermal shock resistance of the crucibles amounted to 60 thermal cycles.

EXAMPLE 2

Crucibles 60 kg in capacity in terms of steel are manufactured from aluminum and magnesium oxides humidified during grinding and taken in the proportions of 65 and 35% by weight respectively. The mixture of the oxides is packed into a fireclay mold with a rod heater from silicided graphite placed at the center. After the oxides are packed, the mold is placed inside an induction furnace, and the heater is inserted in the secondary circuit of the inductor. The temperature of the heater is raised to 450° C. in air at the rate of 30° C./min., and from 450° to 1050° C. in a vacuum of $5 \cdot 10^{-2}$ mm Hg at a rate of 30° C./min. With the temperature of the heater equal to 1050° C., the furnace is filled with argon, and the temperature of the heater is raised to 1800° C. at the rate of 100° C./min. and held at that point. Upon a free separation of the heater from the crucible walls, the crucible is held at the temperature of 1800° C. under vacuum without any physical contact between the heater and the crucible. The overall thermal processing cycle is not more than 150 min. The structure of the crucibles can be described in terms of three layers: a first layer, solidly burned, 1 to 3 mm thick; a second, less burned one, 10 to 20 mm thick; a third layer, which is burned only at the surfaces of contact of the grains and consists practically of the starting oxides. The porosity of the crucibles increased from the first layer, defining the internal surface of the crucible, to the third layer, defining the external surface of the crucibles. The content of spinel in the first layer ranged between 55 and 90% by volume, depending on the burning time. The thermal shock resistance of the crucibles amounted to 70 thermal cycles.

EXAMPLE 3

Pipes to serve as conduits for metal in the pouring of steel, having an average diameter to length ratio ranging between 2-to-1 and 10-to-1, are manufactured from magnesium and aluminum oxides humidified during grinding and dried naturally (at the temperature of 20°–30° C.) taken in the proportions of 28.3 and 71.7% by weight respectively. The oxides are packed into a corundum mold, with a rod heater of graphite being placed at the center of the mold. Once the oxides have been packed, the mold is placed in an induction furnace, and the heater is inserted into the secondary circuit of the inductor. The temperature of the heater is raised to 450° C. in air at the rate of 40° C./min. and from 450° to 950° C. in a vacuum of $5 \cdot 10^{-1}$ mm Hg at the rate of 80° C./min. With the temperature of the heater equal to 950° C., the furnace is filled with argon, and the temperature of the heater is raised to 1850° C. at the rate of 120° C./min. and held at this value.

After a free separation of the heater from the crucible walls, holding is continued under vacuum without physical contact between the heater and the crucible. The overall crucible manufacturing time was not greater than 180 min., this having brought down the manufacturing cost. The structure of the pipe can be characterized in terms of three layers: a first layer, solidly burned, 0.5 to 3 mm thick; a second layer, less burned, 5 to 20 mm thick; a third layer, burned only at the surfaces of contact of grains and consisting practically of the starting oxides. The porosity of the pipes increased from the first layer, defining the internal surfaces of the pipes, to the third layer, defining the external surface of the pipes; this structure is capable of withstanding 70 air thermal cycles. The content of spinel in the first layer ranges between 60 and 95% by volume, depending on the burning time, this making the pipes more inert (resistant) with respect to molten metals as compared to pipes previously known.

EXAMPLE 4

Crucibles 10 kg in capacity in terms of steel are manufactured from MgO and $Al_2O_3$ humidified in grinding and dried naturally and taken in the proportions of 28.3 and 71.7% by weight, respectively. The mixture of the oxides is packed into a corundum mold, a rod heater of silicided graphite being placed at the center. After the oxides have been packed, the mold is placed in an induction furnace, whereas the heater is connected to the secondary circuit of the inductor. The temperature of the inductor is raised in air to 400° C. at the rate of 30° C./min. and from 400° to 1000° C. in a vacuum of $5 \cdot 10^{-2}$ mm Hg at the rate of 60° C./min. With the temperature of the heater equal to 1000° C., the furnace is filled with argon, and the temperature of the heater is raised to 1850° C. at the rate of 120° C./min. and held at this value. After a free separation of the heater from the crucible walls, holding at this temperature is effected in a vacuum without physical contact between the heater and the crucible. The overall thermal processing cycle time is not more than 100 min.

The structure of the crucibles can be characterized in terms of three layers: a first layer, solidly burned, 0.5 to 2 mm thick; a second layer, less burned, 5 to 15 mm thick; a third layer, burned only at the surfaces of the contact of grains and consisting practically of the starting oxides. The porosity of the crucible increased from the first layer, defining the internal surface, to the third layer, defining the external surface. The content of spinel in the first layer was as high as 95%. The thermal shock resistance of the crucible amounts to 65 thermal cycles.

EXAMPLE 5

Pipes, which can be characterized by an average diameter-to-length ratio of 1-to-10, are manufactured from magnesium and aluminum oxides humidified in grinding and dried at a temperature of 200° C. for 2 hours and taken in the proportions of 35 and 65% by weight, respectively. These oxides are packed into a fireclay mold, with a rod heater of silicied graphite being placed at the center. Once the oxides have been packed, the mold is placed in an induction furnace, and the heater is inserted into the secondary circuit of the inductor. The temperature of the heater is raised in air to 420° C. at the rate of 60° C./min. and from 420° C. to 1010° C. in a vacuum of $5 \cdot 10^{-1}$ mm Hg at the rate of 80° C./min. With the temperature of the heater equal to 1010° C., the furnace is filled with argon, and the temperature of the heater is raised to 1820° C. at the rate of 300° C./min. and held at this value. Upon a free separation of the heater from crucible walls, the crucible is held in vacuum out of contact with the heater at the above temperature of the heater.

The structure of the pipes can be characterized in terms of three layers: a first layer, solidly burned, 1 to 3.5 mm thick; a second layer, less burned, 10 to 25 mm thick; a third layer, burned only at the surfaces of contact of grains and consisting practically of the starting oxides. The porosity of the pipes increased from the first layer, defining the internal surface of the crucible, to the third layer, defining the external surface of the crucible. The content of spinel in the first layer ranged from 60 to 90% by volume, depending on the burning time. The thermal shock resistance of the pipes is 70 thermal cycles.

What is claimed is:

1. A method for manufacturing highly refractory ceramic items from aluminum and magnesium oxides, comprising mixing said oxides in the ratios of 65 to 72 wt. % aluminum oxide and 35 to 28 wt. % magnesium oxide, introducing the mixture into a mold having a heater at the center thereof, packing the oxides to form an item, drying said item by raising the temperature of the heater in air to 400°–450° C. at the rate of 30°–60° C./min. and under vacuum to a temperature of 950°–1050° C. at the rate of 30°–100° C./min, burning the item in an inert gas atmosphere heated to a temperature of 1800°–1850° C. at a rate equal to or higher than 100° C./min for a time sufficient to enable free separation of the item from the heater, burning said item under vacuum at the same temperature and cooling the burned item, the total manufacturing time being from 2 to 4 hours.

2. The method according to claim 1 wherein the burning of the item under vacuum at 1800°–1850° C. is carried out until a completely burned inner layer is formed and the outer layer exhibits burning only at the surfaces of contact of the oxide particles.

* * * * *